Patented Mar. 5, 1935

1,993,152

UNITED STATES PATENT OFFICE 1,993,152

COMPOSITION OF FATTY MATTER AND PROCESS OF STABILIZING SAME

Eddy W. Eckey, Wyoming, Ohio, assignor to The Procter & Gamble Company, Cincinnati, Ohio, a corporation of Ohio No Drawing. Application August 22, 1932, Serial No. 629,891

11 Claims. (Cl. 99—11)

This invention relates to methods of treating fatty materials for the purpose of retarding oxidation by air and the undesirable changes that accompany oxidation, and relates also to fatty materials stabilized by such treatment.

All the fats and fatty materials used for edible or industrial purposes are subject to some extent to oxidation by air and in general the changes that accompany oxidation are undesirable. Thus, edible oils and fats lose their fresh flavor and eventually become rancid; solid shortenings often change in appearance, taking on a vaseline-like appearance in place of their original whiteness. Various compositions containing oils are injured when the oils they contain become oxidized; thus artificial leather loses its softness and pliability from this cause.

In the application of Richardson, Vibrans and Andrews, Serial No. 627,618 filed Aug. 5, 1932, it is disclosed that materials of a certain class have the property of retarding oxidation when mixed with substantially dry fat in small proportions. This class of materials consists of mineral acids containing stably bound oxygen (i. e. contain oxygen but are not strong oxidizing agents) and their acid salts or esters. Experience has shown that edible fats treated according to the process described in this prior invention, although greatly improved with respect to the development of extremely objectionable rancid odor and flavor, tend to acquire a characteristic flavor which though not a flavor of rancidity is slightly objectionable. Also, fats so treated tend to become discolored, especially when heated.

The present invention has for its object an improvement making possible this treatment of fats without alteration of their odor or flavor and without causing darkening or any other undesirable change in the fat even when it is heated to a high temperature, at the same time greatly improving the resistance of the fat to oxidation.

My process consists in treating fat with an unusually small quantity of an acid reacting compound containing the phosphate radical, such quantity being much smaller than that of any stabilizer or anti-oxygen ordinarily used for protecting oxidizable materal. In accordance with my invention fatty material is treated with 0.01% orthophosphoric acid or less, or with an acid reacting derivative of phosphoric acid, especially a salt or ester, in quantity such that a correspondingly small proportion of combined phosphoric anhydride is introduced into the fatty material.

It is a surprising fact that such quantities, small enough to have no injurious effect on the odor, flavor or color of the fat even when it is heated to a high temperature, have nevertheless a greater stabilizing effect than larger percentages. Addition to fat of less than 0.01 percent of phosphoric acid or its equivalent in the form of acid salt or ester confers upon it more resistance to oxidation than the addition of more than 0.01 percent. Quantities as low as 0.0001 percent and even lower have been found to have marked beneficial effects.

By the term phosphoric acid, orthophosphoric acid is meant, but the related acids such as pyrophosphoric acid, metaphosphoric acid, phosphoric anhydride, the various polyphosphoric acids and the acid salts and esters of all these are within the scope of this invention, their action on fats being similar.

The following are examples of how the invention may be applied.

*Example 1.*—Orthophosphoric acid was added to salad oil (deodorized cottonseed oil) in quantities to give concentrations of .01, .003, .001 and .0005 percent in the oil. Samples of the treated oils and the untreated oil were compared by storage tests as well as accelerated tests to determine their resistance to oxidation by air. The treated oils kept at least three times as well as the untreated oil. Moreover, the samples treated with less than 0.01 percent phosphoric acid had a better flavor after storage than the untreated oil or the oil containing 0.01 percent acid. On the whole, the oils treated with the lowest percentages of phosphoric acid were the best.

*Example 2.*—A similar series of tests but with still smaller concentrations showed that improvement of the oil occurred when as little as 0.00005 percent of phosphoric acid was added to salad oil. Orthophosphoric acid was added to deodorized cottonseed oil in quantities sufficient to give 0.00005, 0.0003 and 0.01 percent of acid in the oil. Tests showed that the oil treated with 0.00005 per cent phosphoric acid took 30 percent longer to reach a given state of oxidation than the untreated oil. The oil treated with .0003 or .01 percent acid took 200 percent longer, i. e. kept three times as well as the untreated oil. The oils with the best flavor during storage were the ones treated with the smaller concentrations of phosphoric acid.

*Example 3.*—Salad oil was treated with calcium acid phosphate $Ca(H_2PO_4)_2 \cdot H_2O$ and examined by various tests for keeping quality. The oil was agitated with excess of the powdered chemical and filtered. A portion of the treated oil was diluted with three parts of untreated oil. Estimated by analysis, the treated oils contained 0.001 and 0.004 percent of calcium acid phosphate. They were found to be from 2½ to 3 times as resistant to oxidation as the untreated oil.

Having thus described my invention, what I claim as new and desire to secure by Letters Patent, is:

1. A process for treating substantially dry fats or fatty materials to retard oxidation and the consequent undesirable changes, without at the same time causing undesirable changes in color, odor and flavor, consisting in treating the fat with a compound of the group comprising phosphoric acid and its acid reacting derivatives, in quantity such that the combined phosphoric anhydride so introduced is equivalent to less than 0.01% of phosphoric acid in the fatty material.

2. A process for treating substantially dry fats or fatty materials to retard oxidation and the consequent undesirable changes, without at the same time causing undesirable changes in color, odor and flavor, consisting in treating the fat with less than 0.01 percent of phosphoric acid.

3. A process for treating substantially dry fats or fatty materials to retard oxidation and the consequent undesirable changes, without at the same time causing undesirable changes in color, odor and flavor, consisting in treating the fat with less than 0.01 percent of an acid phosphate.

4. A process for treating substantially dry fats or fatty materials to retard oxidation and the consequent undesirable changes without at the same time causing undesirable changes in color, odor and flavor, consisting in treating the fat with less than 0.01 percent of an acid reacting ester of phosphoric acid.

5. Substantially dry fatty material stabilized by the addition of a compound of the group comprising phosphoric acid and its acid reacting derivatives, in quantity not exceeding 0.01 percent phosphoric acid ($H_3PO_4$) or its equivalent in combined phosphoric anhydride.

6. Substantially dry fatty material stabilized by the addition of phosphoric acid in a quantity not exceeding 0.01 percent.

7. Substantially dry fatty material stabilized by the addition of an acid salt of phosphoric acid in a quantity not exceeding 0.01 percent.

8. Substantially dry fatty material stabilized by the addition of acid reacting ester of phosphoric acid in a quantity such that the combined phosphoric acid does not exceed 0.01 percent of the weight of fatty material.

9. Substantially dry edible oil stabilized by the addition of less than 0.01% of phosphoric acid.

10. Substantially dry salad oil stabilized by the addition of less than 0.01 percent of phosphoric acid.

11. Substantially dry shortening stabilized by the addition of less than 0.01 percent of phosphoric acid.

EDDY W. ECKEY.